(12) United States Patent
Tenzek et al.

(10) Patent No.: US 7,789,660 B2
(45) Date of Patent: Sep. 7, 2010

(54) FURNACE ALIGNMENT SYSTEM

(75) Inventors: Anthony M. Tenzek, Hanoverton, OH (US); David A. Lazor, Hubbard, OH (US)

(73) Assignee: Ajax Tocco Magnethermic Corporation, Euclid, OH (US)

(*) Notice: Subject to any disclaimer, the term of this patent is extended or adjusted under 35 U.S.C. 154(b) by 584 days.

(21) Appl. No.: 11/439,852

(22) Filed: May 24, 2006

(65) Prior Publication Data
US 2007/0128569 A1 Jun. 7, 2007

Related U.S. Application Data

(60) Provisional application No. 60/748,819, filed on Dec. 7, 2005.

(51) Int. Cl.
*F27B 9/18* (2006.01)
(52) U.S. Cl. .................. 432/121; 432/205; 432/208; 432/154; 373/144; 373/152; 219/672
(58) Field of Classification Search ............ 432/128, 432/88, 93, 123, 134, 137, 154, 157, 251, 432/205, 208, 121, 153; 198/468.6; 414/157, 414/198, 209, 210, 150, 166, 804; 373/144, 373/151, 152, 156, 139, 105, 27, 157; 219/672, 219/634, 674, 635, 121.54, 121.43, 121.48, 219/121.57, 121.41
See application file for complete search history.

(56) References Cited

U.S. PATENT DOCUMENTS

| | | | | |
|---|---|---|---|---|
| 1,956,401 A | | 4/1934 | Russ | |
| 2,457,846 A | * | 1/1949 | Strickland, Jr. | 219/649 |
| 2,811,345 A | | 10/1957 | Roe | |
| 3,071,356 A | * | 1/1963 | Duffy | 432/87 |
| 3,535,080 A | | 10/1970 | Van Der Pyl | |
| 3,926,415 A | * | 12/1975 | Konas et al. | 266/252 |
| 4,117,252 A | | 9/1978 | McMaster | |
| 4,512,737 A | * | 4/1985 | Pierce | 432/205 |
| 4,758,157 A | * | 7/1988 | Hailey | 432/121 |
| 4,764,108 A | | 8/1988 | Carthew et al. | 432/128 |
| 5,006,063 A | * | 4/1991 | Poggi et al. | 432/121 |
| 5,370,531 A | * | 12/1994 | Tsurumi et al. | 432/242 |
| 5,443,383 A | * | 8/1995 | Kuehn | 432/122 |
| 6,178,192 B1 | | 1/2001 | Chisaki | |
| 6,355,906 B1 | * | 3/2002 | Okuno et al. | 219/121.63 |
| 6,422,798 B1 | * | 7/2002 | Lauinger et al. | 414/217 |
| 6,457,971 B2 | | 10/2002 | Orbeck | |
| 6,476,366 B2 | * | 11/2002 | Lipperts | 219/615 |

(Continued)

*Primary Examiner*—Gregory A Wilson
(74) *Attorney, Agent, or Firm*—Sand & Sebolt (57) ABSTRACT

A pusher furnace includes furnace sections having respective susceptors, a slide rail extending through the furnace sections for sliding pusher plates thereon and an alignment assembly for aligning the susceptors and slide rails of adjacent furnace sections. A support structure spaces the susceptors from insulation therebelow to protect the insulation from degradation from contact with the susceptors. The susceptors are slidably mounted on the support structure to accommodate thermal expansion and shrinkage of the susceptor. The upstream end of the slide rails have beveled upper edges to help prevent the pusher plates from catching thereon. The upstream ends are also laterally tapered to reduce the degree of force encountered should a pusher plate catch thereon. Adjacent insulation members have expansion joints filled with a refractory felt. The susceptors slidably and sealingly engage exhaust ports to allow for thermal expansion and shrinkage of the susceptor without damaging the exhaust port.

50 Claims, 6 Drawing Sheets

U.S. PATENT DOCUMENTS

| | | | |
|---|---|---|---|
| 6,855,907 B2 * | 2/2005 | Bertuzzi et al. | 219/121.39 |
| 7,466,740 B2 * | 12/2008 | Lazor | 373/144 |
| 2007/0125769 A1 * | 6/2007 | Tenzek | 219/634 |
| 2007/0127542 A1 * | 6/2007 | Lazor | 373/144 |
| 2007/0128006 A1 * | 6/2007 | Tenzek | 414/166 |

* cited by examiner

FIG-7

FURNACE ALIGNMENT SYSTEM

CROSS REFERENCE TO RELATED APPLICATIONS

This application claims priority from U.S. Provisional Application Ser. No. 60/748,819 filed Dec. 7, 2005; the disclosure of which is incorporated herein by reference.

BACKGROUND OF THE INVENTION

1. Technical Field

The invention relates generally to pusher furnaces. More particularly, the invention relates to a pusher furnace having an alignment mechanism for aligning multiple furnace sections which are joined to one another to make up a portion of the furnace. Specifically, the invention relates to such a pusher furnace which is configured to control the expansion of insulation and other structures within each furnace section while allowing the thermal expansion and contraction of an inductively heated susceptor over the length of the furnace sections while minimizing degradation of the insulation and providing for smooth continuous movement of pusher plates through the furnace. The furnace is able to repeatedly cool and reheat without damage to the furnace, its internal parts and insulation system.

2. Background Information

While pusher furnaces are generally known in the art, many of such furnaces are indexing furnaces in which pusher plates and loads thereon move in intermittent steps through the furnace. In addition, many pusher furnaces are relatively short and heated to relatively low temperatures, sometimes only with resistance heating mechanisms.

However, some products must be fired at far higher temperatures and be moved in a continuous manner through various heating zones having different temperature ranges and cooling zones having different temperature ranges in order to provide a specific temperature profile necessary to achieve the desired characteristics of the final product. In general, silicone carbide products are within the category which are typically fired at very high temperatures. Some of these products and other products require the previously noted closely controlled temperature profile, an example of which are diesel particulate filters.

In order to incorporate the necessary heating and cooling zones to achieve the closely controlled temperature profile, a furnace must be quite lengthy. This length alone presents the need for movement of pusher plates on slide rails which are aligned within close tolerances. The lengthy nature of the furnace also requires that the furnace be formed in sections wherein various portions thereof need to be closely aligned to prevent damage thereto during assembly and to facilitate the close tolerances of the slide rails mentioned above. The length of the furnace and the need for separate furnace sections requires that the slide rails, susceptor sections, insulation and support sections be formed in multiple sections. This increases the potential for jamming of the slide plates as they move through the furnace. The use of multiple furnace sections presents a need to insure that during the heating process all susceptor and insulation entities thermally expand to form proper thermal and gas non-permeable seals. Likewise, it is necessary to maintain these seals during cooling of the furnace, which causes contraction of these various structures. These and other issues are addressed by the present invention.

BRIEF SUMMARY OF THE INVENTION

The present invention provides a pusher furnace comprising a plurality of furnace sections each including a susceptor; at least one slide rail extending through the furnace sections and adapted for slidably mounting pusher plates thereon; and an alignment assembly for aligning the susceptors with one another.

BRIEF DESCRIPTION OF THE SEVERAL VIEWS OF THE DRAWINGS

Similar numbers refer to similar parts throughout the drawings.

DETAILED DESCRIPTION OF THE INVENTION

Figure 1:
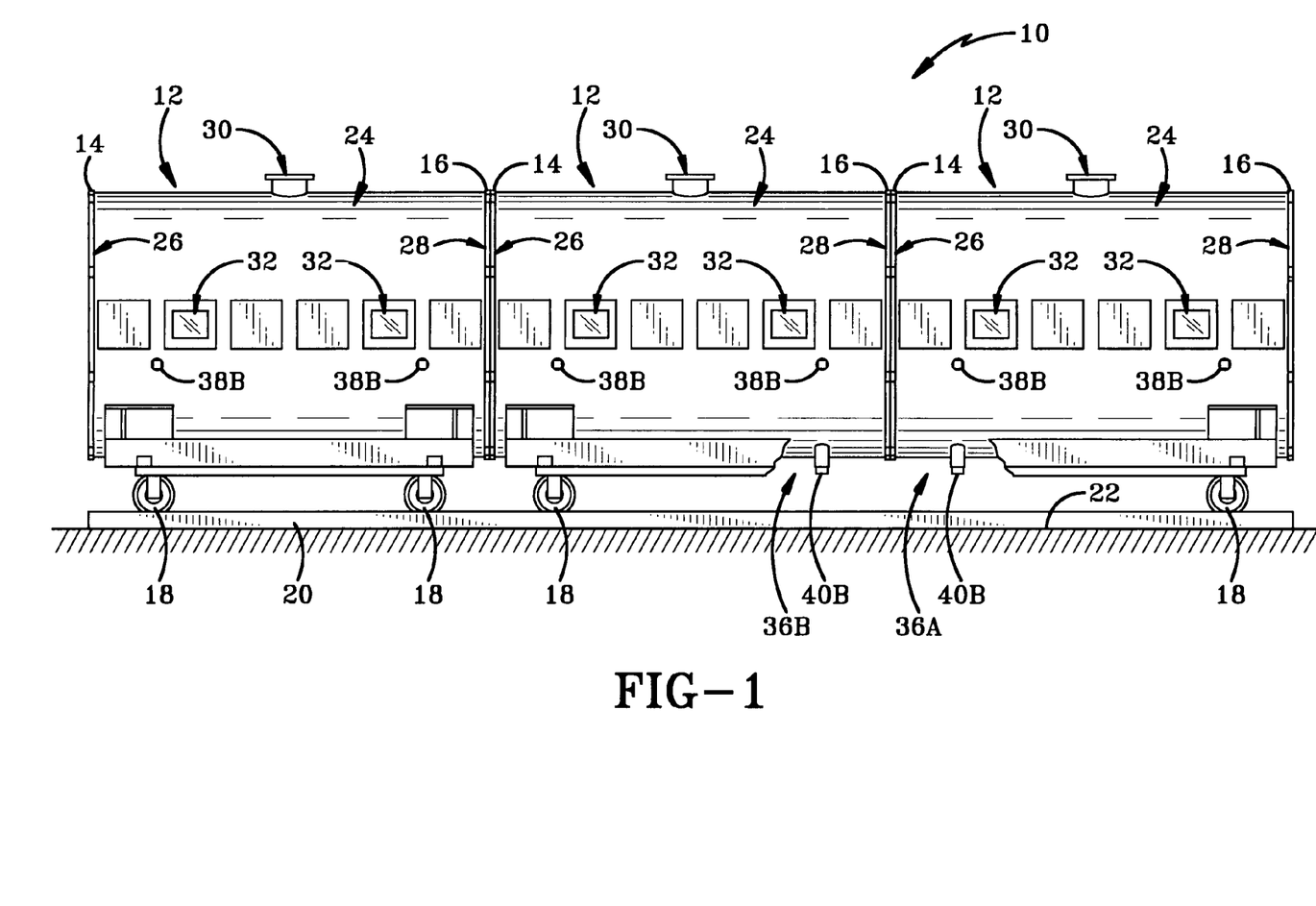
FIG. 1 is a diagrammatic side elevational view of the furnace of the present invention.
Figure 2:
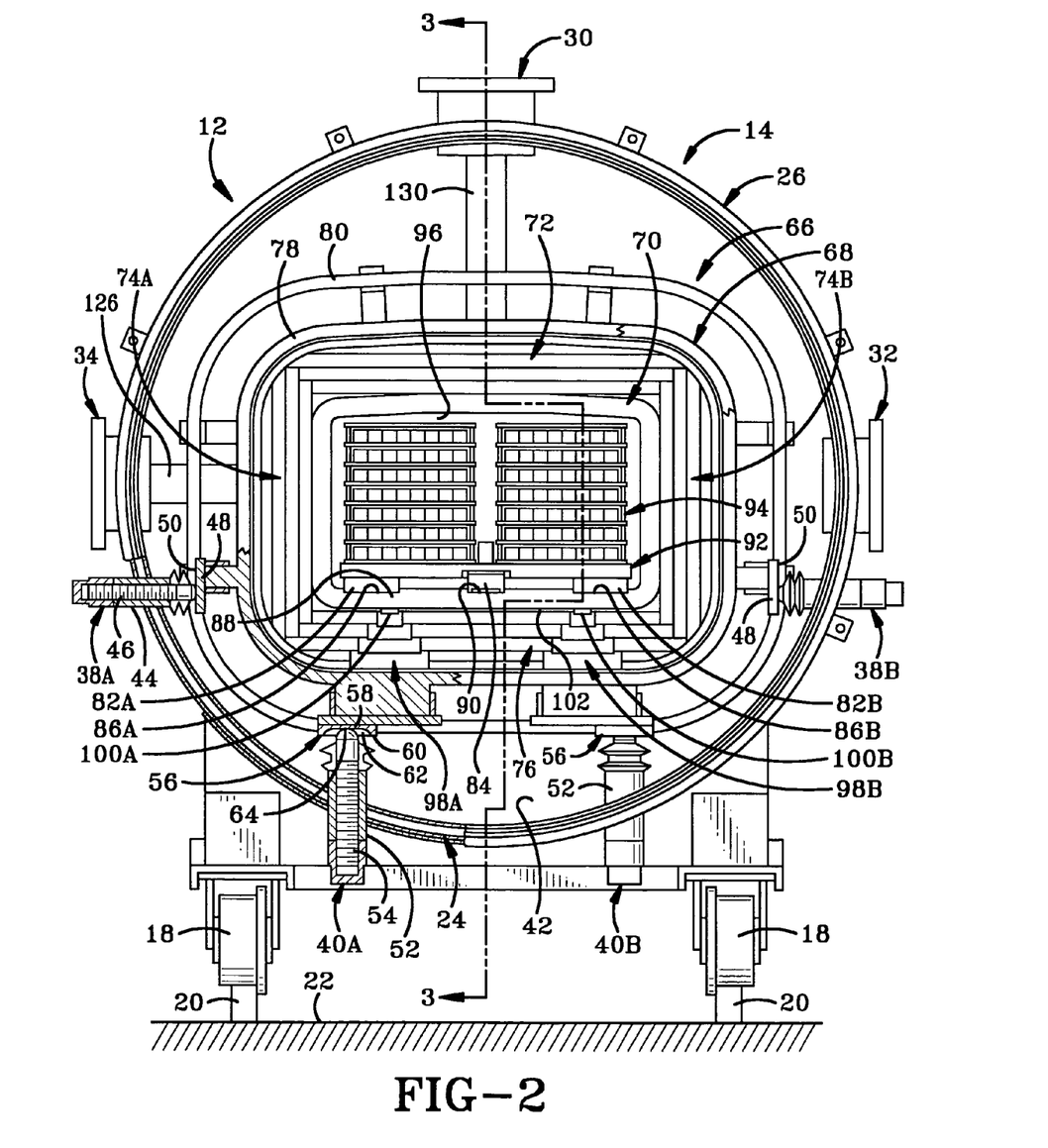
FIG. 2 is an enlarged end elevational view of the furnace of FIG. 1.
Figure 3:
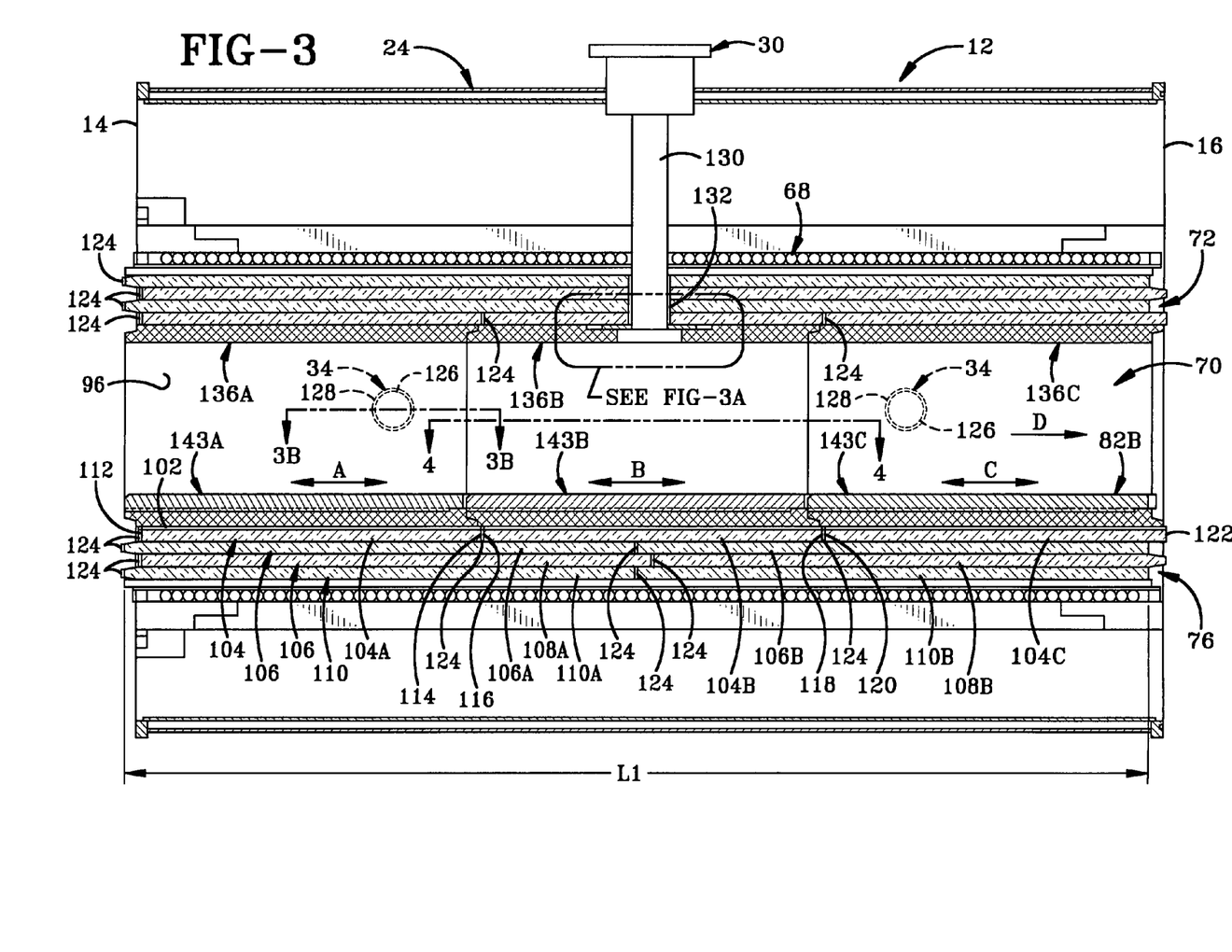
FIG. 3 is a sectional view taken on line 3-3 of FIG. 2.

The pusher furnace of the present invention is indicated generally at 10 in FIG. 1. Furnace 10 includes a plurality of furnace sections 12 which are identical or substantially the same as one another. The furnace section 12 has a first or upstream end 14 and a second or downstream end 16 opposed thereto wherein first and second ends 14 and 16 define therebetween a longitudinal direction of the furnace section which is the same for furnace 10. Each of furnace sections 12 is generally supported on wheels 18 which roll on spaced tracks 20 which are seated atop a supporting surface 22 such as a floor or the like. Furnace section 12 includes a double walled outer vessel 24 having first and second mounting flanges 26 and 28 disposed respectively adjacent first and second ends 14 and 16 thereof for mounting to adjacent furnace section 12 via fasteners, such as bolts or the like (not shown). Each furnace section 12 includes an exhaust port 30, a pair of first sight ports 32 and a pair of second sight ports 34 (FIGS. 2-3).

In accordance with the invention, each furnace section 12 includes an adjustment assembly comprising first and second longitudinally spaced sets of adjustment screw assemblies 36A and 36B disposed respectively adjacent first and second ends 14 and 16 of a respective section 12. Referring to FIG. 2, each assembly 36 includes first and second horizontal adjustment screw assemblies 38A and 38B which are axially spaced from and in opposed relationship to one another generally on opposite sides of outer vessel 24. Each screw assembly 38 extends from outside outer vessel 24 and to an interior chamber 42 defined thereby. Each horizontal adjustment screw assembly 38 includes an internally threaded member 44 which is rigidly mounted on outer vessel 42 and a screw 46 which threadably engages threaded member 44 to move in a substantially horizontal direction. Each screw assembly 38 further includes an adjustment plate 48 which has a substantially vertical adjustment surface 50 which is engaged by an end of screw 46 in order to provide horizontal adjustment of plate 48 and allow vertical movement of plate 48 relative to screw 46 when assemblies 36 provide vertical adjustment.

Each assembly 36 further includes first and second vertical adjustment screw assemblies 40A and 40B which are axially spaced from one another generally along the bottom of outer vessel 24. Screw assemblies 40A and B extend from external to outer vessel 24 into interior chamber 42 thereof. Each assembly 40 includes an internally threaded member 52 which is rigidly mounted on outer vessel 24 and a screw 54 which is threadably mounted on threaded member 52 in order to move in a substantially vertical direction. Each assembly 40 further includes adjustment cap 56 which includes an upper wall 58 and a downwardly depending side wall or flange 60 defining therein a downwardly opening cup shaped opening 62 bounded in part by a substantially flat horizontal lower surface 64 of upper wall 58. Furnace 10 includes an internal structure 66 which is supported entirely on screws 54 via caps 56. Lower surface 64 allows caps 56 and internal structure 66 to move horizontally atop screws 54 when assemblies 38 are operated.

Internal structure 66 includes an induction coil 68 associated with each section 12, a susceptor 70 which is disposed within induction coil 68 and is inductively heated when induction coil 68 is powered. Internal structure 66 includes multiple layers of insulation which surround susceptor 70 and are disposed between susceptor 70 and induction coil 68. These insulation layers include top insulation layers 72, first and second lateral insulation layers 74A and 74B which are on opposite sides of susceptor 70 from one another, and bottom insulation layers 76 disposed below susceptor 70. Internal structure 66 further includes an internal faraday ring 78 and an outer faraday ring 80 which are described in greater detail in the copending application having Ser. No. 60/749,015 and entitled Induction Coil Having Internal And External Faradic Rings, which was filed on Dec. 7, 2005 and is incorporated herein by reference.

Inner structure 66 further includes a pair of spaced slide rails 82A and 82B which are parallel to one another and extend longitudinally from a respective first. end 14 to a respective second end 16 of section 12. Likewise, guide rail 84 is centrally disposed between and is parallel to slide rails 82A and 82B and extends longitudinally over substantially the same length as slide rails 82. Slide rails 82A and 82B are seated within respective mating recesses 86A and 86B formed in a bottom wall 88 of susceptor 70. Guide rail 84 is likewise seated within a mating recess 90 formed in bottom wall 88 of susceptor 70. A plurality of load plates or pusher plates 92 (FIG. 7) are seated on slide rails 82 and are pushed to slide along slide rails 82 with adjacent pusher plates 92 in abutment with one another. Pusher plates 92 are moved in a continuous manner through the furnace as more particularly detailed in the copending application having Ser. No. 60/749,320 and entitled Method And Apparatus To Provide Continuous Movement Through A Furnace, which was filed on Dec. 7, 2005 and is incorporated herein by reference. Pusher plates 92 define respective central guide slots in which a portion of guide rail 84 is received to assist in guiding pusher plates 92 through furnace 10. These central guide slots formed in pusher plates 92 have a bow tie configuration which is more particularly detailed in the copending application having Ser. No. 60/749,016 and entitled Guidance System For Pusher Plate For Use In Pusher Furnaces, which was filed on Dec. 7, 2005 and is incorporated herein by reference. Respective loads 94 are seated on pusher plates 92 to be heated within a sealed interior chamber 96 defined by susceptor 70. Slide rails 82 and guide rail 84 are also disposed in interior chamber 96.

In accordance with the invention, internal structure 66 includes first and second axially spaced and longitudinally elongated pedestals or supports 98A and 98B which are seated within induction coil 68 and interior chamber 96. Supports 98 extend substantially the same length as susceptor 70 and insulation layers 72, 74 and 76. Respective layers of graphoil 100A and 100B or a graphoil type material are seated respectively atop supports 98A and 98B along the length thereof in respective recesses formed therein. More particularly, bottom wall 88 of susceptor 70 is spaced upwardly of bottom insulation layers 76 to define a space 102 therebetween. Thus, susceptor 70 is supported entirely on layers of graphoil 100 and do not contact bottom insulation layers 76. This arrangement helps to preserve bottom insulation layers 76 by eliminating the weight and friction thereon of susceptor 70 and any weight contributed thereto by top insulation layers 72 and any other pertinent part of internal structure 66. This also eliminates degradation due to differing thermal expansion and contraction rates during heating and cooling of susceptor 70 and bottom insulation layers 76 which would occur if the susceptor were seated atop the insulation. Graphoil 100 provides a low-friction material which allows for the thermal expansion and contraction of susceptor 70 without substantial wear caused by the engagement therebetween. In addition, supports 98 are formed of a material having a significantly higher compressive strength than that of insulation layers 76 but also having very low thermal conductivity, characteristics which are typically mutually exclusive. Supports 98 thus provide good insulation properties and a strength suitable to support susceptor 70 with minimal degradation to supports 98 over time in contrast to degradation which would typically occur to insulation layers 76 if susceptor 70 were seated thereon. In one preferred embodiment, supports 98 are formed of a rigid, incompressible graphite foam-like material. One such material is available from Union Carbide and is known as FPA. Because supports 98 and the various insulation layers 72, 74 and 76 all provide insulation properties, each of the various members making up these elements are considered to be insulation members.

With this in mind and in accordance with the invention, features of the invention related to the expansion and contraction during heating and cooling of the insulation layers 72, 74 and 76 are described which also apply to the various layers of supports 98. Referring to FIG. 3, bottom insulation layers 76 include an upper first layer 104, an intermediate second layer 106 disposed below and in contact with layer 104, an intermediate third layer 108 disposed below and in contact with layer 104 and a lower fourth layer 110 disposed below and in contact with layer 108. More particularly, first layer 104 includes first, second and third sections 104A, 104B and 104C which are generally situated in an end to end configuration. Likewise, second layer 106 includes first and second sections 106A and 106B, third layer includes first and second sections 108A and 108B and fourth layer includes first and second sections 110A and 110B. First section 104A has first and second opposed ends 112 and 114, second section 104B has first and second opposed ends 116 and 118 and third section 104C has first and second opposed ends 120 and 122.

In accordance with the invention, expansion joint members in the form of respective pieces 124 of graphite felt or carbon felt are disposed respectively adjacent first end 112, between ends 114 and 116 and between ends 118 and 120. Thus, the gap formed between end 114 and 116 is substantially filled with a piece 124 of the felt and the gap formed between end 118 and 120 is substantially filled with a piece 124 of the felt.

Figure 7:
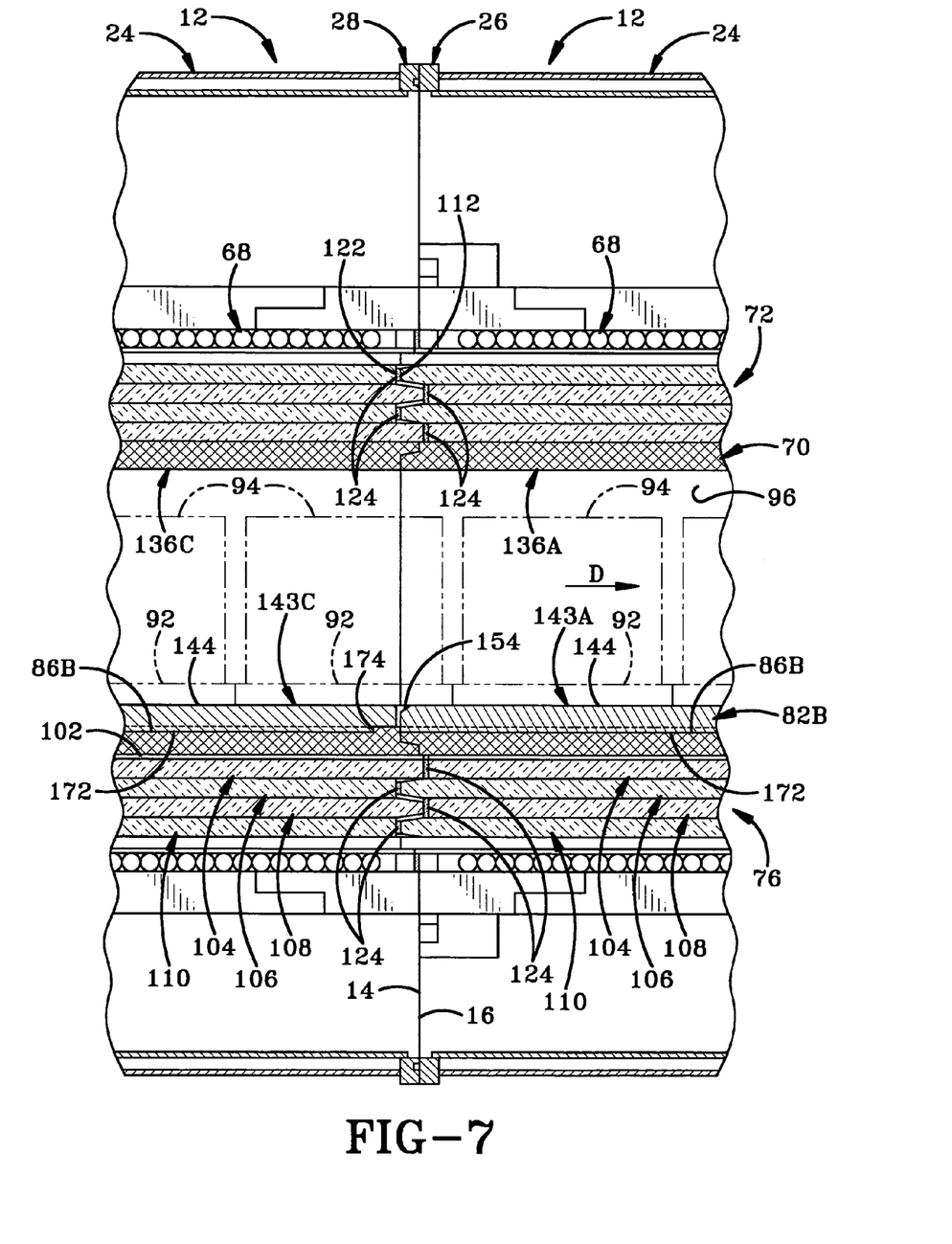
FIG. 7 is an enlarged fragmentary sectional view showing two furnace sections joined to one another.

Further, the piece 124 of felt disposed adjacent end 112 will substantially fill the gap which is formed between first end 112 of first section 104A and a corresponding second end 122 of a third section 104C of an adjacent furnace section 12 when the adjacent sections 12 are connected to one another (FIG. 7). Likewise, additional pieces 124 of the felt are shown adjacent the opposed ends of each of first section 106A, first section 108A and first section 110A. Pieces 124 of felt are compressible and de-compressible to allow respectively for the expansion and contraction of the various sections of layers 104, 106, 108 and 110 while providing insulation between the respective adjacent sections of insulation. This concept and configuration applies to all the insulation members, including layers 72, 74, 76 and support 98.

In furnace 10, one or more of the sections 12 will define heat zones which differ from one another, that is heated to different temperature ranges from one another. Thus, each piece 124 of felt has a thickness sized in accordance with the thermal expansion of the respective materials of which the insulation members are formed and which are in accordance with a specific heat zone. Thus, each layer of insulation is configured so that expansion thereof during heating is limited or substantially limited to a given furnace section 12. By way of example, fourth insulation layer 110 has opposed ends defining therebetween a length L1 which will remain substantially the same during heating and cooling due to the fact that pieces 124 of felt allow for the expansion of insulation sections 110A and 110B within that given furnace section 12. Also by way of example, the expansion of sections 104A, B and C are respectively represented at arrows A, B and C of FIG. 3.

Thus, while each insulation member expands during heating, the length of an insulation layer comprising a plurality of insulation members within a given furnace section 12 remains substantially the same during heating and cooling thereof. As a result, the various insulation layers in a given section 12 do not create expansion pressures which are sufficient to affect the associated insulation layers of adjacent furnace sections 12. While FIG. 1 shows only three sections 12 of furnace 10, furnace 10 typically includes many more sections 12 to form a rather long pusher furnace. Thus, without insulative expansion joints provided by pieces 124 of felt, expansion pressures would build up over the entire length of multiple sections 12 of the furnace which would tend to degrade or crush the insulation material itself or damage other structures within the furnace.

Figure 3A:
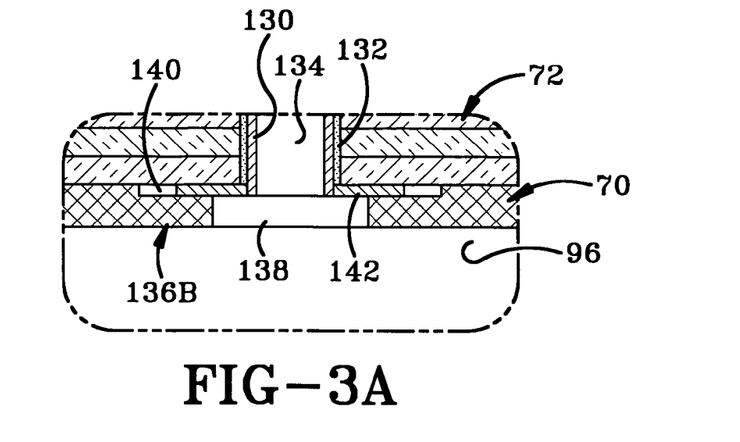
FIG. 3A is an enlarged sectional view of the encircled portion of FIG. 3.
Figure 3B:
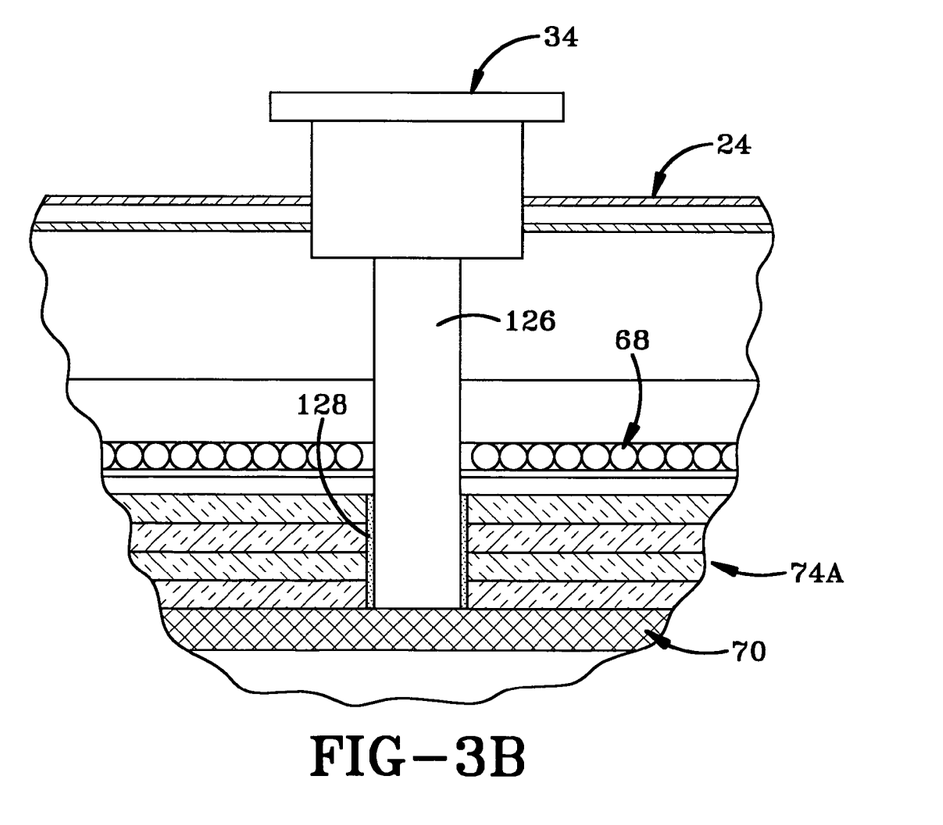
FIG. 3B is a sectional view taken on line 3B-3B of FIG. 3.

Exhaust port 30 and second sight ports 34 provide good examples of such structure which could be damaged by expansion pressures if pieces 124 of felt were not provided. With reference to FIG. 3B, each sight port 34 is mounted on double-walled outer vessel 24 and extends therethrough. Each port 34 includes a pipe 126 which extends from adjacent the double wall vessel 24 to a side wall of susceptor 70, being closely adjacent to or in contact with susceptor 70. Pipe 126 extends through an opening through lateral insulation layers 74A. Within this opening is also disposed a sleeve 128 which surrounds pipe 126 and is formed of graphite or carbon felt having the characteristics noted with regard to pieces 124. Sleeve 128 and pieces 124 of felt in combination allow the expansion of the various sections of lateral insulation layers 74A to occur within a furnace section 12 without damaging pipe 126 of side port 34.

Similarly, exhaust port 30 (FIGS. 3 and 3A) includes a pipe 130 which extends through an opening in top insulation layers 72. A sleeve 132 of felt is similarly disposed within this opening and surrounds pipe 130 therein in order to provide the same characteristics as described with regard to sleeve 128 of felt. However, pipe 130 must also provide a passage 134 which communicates with interior chamber 96 of susceptor 70 in order to provide the exhaust capability thereof. While insulation layers 72 are configured to prevent damage to pipe 130, susceptor 70 does not provide expansion joints and thus expands and contracts along the entire length thereof during heating and cooling. In general, furnace 10 heats to rather high temperatures and in certain sections 12 thereof, the temperatures may reach as high as 2,400° C. (4,352° F.) for particular applications. Due to the length of susceptor 70, it may expand several inches during heating. The present invention further addresses the problems associated with such expansion and contraction, and is more particularly addressed in the copending application having Ser. No. 60/748,872 and entitled Method And Apparatus For Controlling Furnace Position In Response To Thermal Expansion, which was filed on Dec. 7, 2005 and incorporated herein by reference. As shown in FIG. 3, there are three susceptor sections 136A, B, and C within section 12 which form the portion of susceptor 70 disposed within section 12. Adjacent sections 136 abut one another at an overlapping joint in the form of a shiplap joint. Similarly, each portion of susceptor 70 disposed within a given section 12 abuts a respective portion of susceptor 70 in an adjacent section 12 (FIG. 7).

Due to the thermal expansion and contraction of susceptor 70 along its length, a mechanism is provided to maintain the communication of passage 134 and interior chamber 96 without damaging pipe 130 of exhaust port 30. Referring to FIG. 3A, an upper wall of susceptor section 136B defines a longitudinally elongated opening 138 which communicates with interior chamber 96 of susceptor 70 and passage 134 of pipe 130. Susceptor section 136B further defines a recess 140 which extends downwardly from the upper surface of section 136B and which communicates with opening 138. More particularly, recess 140 is generally larger around than is opening 138 and is stepped downwardly to opening 138. A substantially flat plate or flange 142 is connected to the lower end of pipe 130 and extends radially outwardly therefrom. Flange 142 is disposed in recess 140 and is sealingly seated on a portion of susceptor section 136 which bounds recess 140. Flange 142 has a longitudinal length which is shorter than that of recess 140 so that as susceptor 70 expands and contracts during heating and cooling, susceptor 70 is able to move longitudinally while slidably engaging flange 142 to maintain the seal therebetween and allow passage 134 to be aligned with a portion of elongated opening 138 to maintain an exhaust passage through exhaust port 30 without causing damage to pipe 130.

Figure 4:
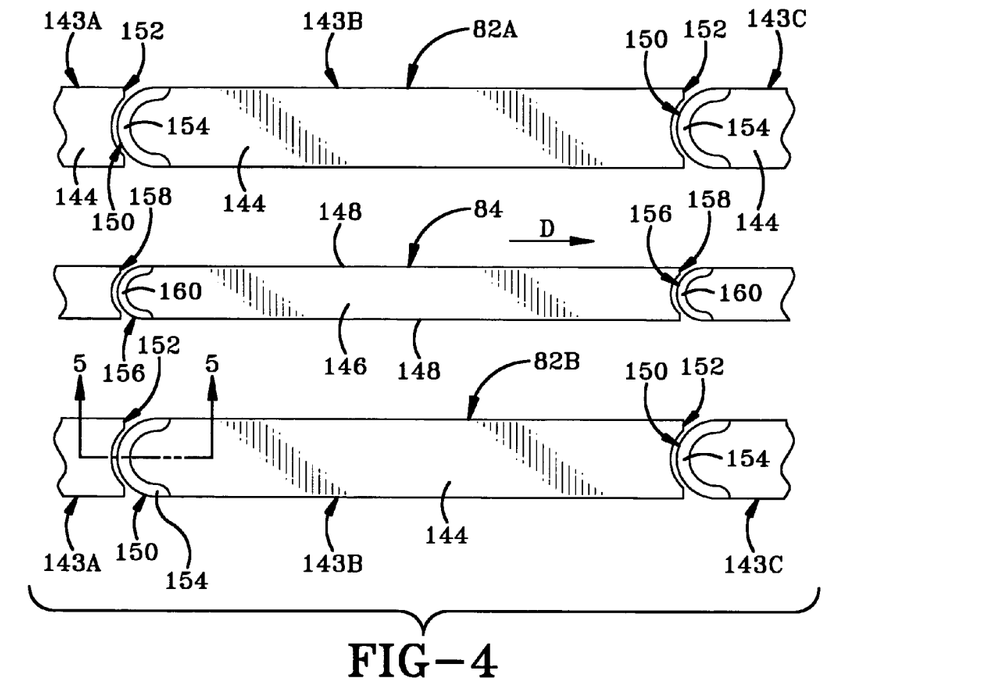
FIG. 4 is an enlarged fragmentary sectional view taken on line 4-4 of FIG. 3 showing the first embodiment of the slide rails and guide rail.
Figure 5:
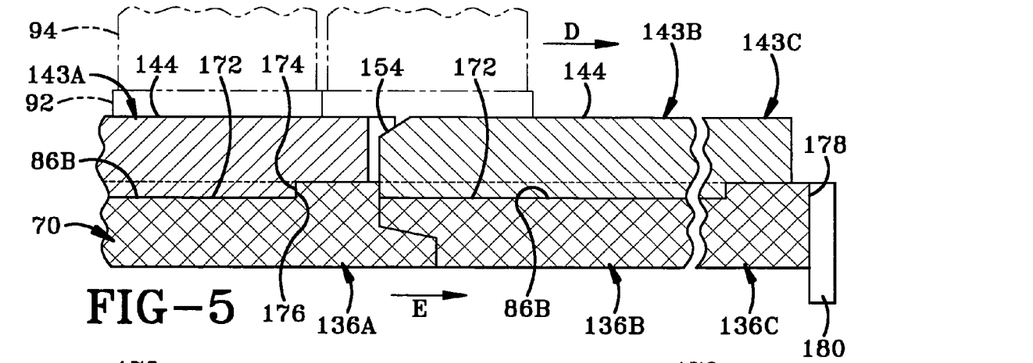
FIG. 5 is a sectional view taken on line 5-5 of FIG. 4.

In accordance with the invention, slide rails 82 and guide rail 84 are further described. Referring to FIGS. 3, 4 and 5, each slide rail 82 includes first, second and third slide rail sections 143A, B and C within furnace section 12. Slide rail sections 143 are longitudinally spaced from one another at all times, even when thermally expanded to the highest temperatures to be obtained within furnace 10. When cooled, sections 143 will of course be longitudinally spaced from one another a greater distance than when heated, but will still remain adjacent one another. Maintaining this longitudinal spacing at all times allows slide rail sections 143 of each furnace section 12 to thermally expand and contract independently. Thus, as with the insulation members discussed previously, rail sections 143 within a given section 12 do not expand to a degree sufficient to affect the rail sections in adjacent sections 12. The rail sections of guide rail 84 are likewise longitudinally spaced at all times for the same purpose. Pusher plates 92 and loads 94 (FIG. 2) travel through furnace 10 as indicated at Arrow D in FIGS. 3, 4, 5 and 7. As pusher plates 92 move through furnace 10, they slide on respective upper surfaces 144 of rail sections 143 of slide rails 82A and B. During normal operation, pusher plates 92 are spaced upwardly of an upper surface 146 of guide rail 84 although portions of pusher plates 92 bounding the guide slot thereof will contact continuously or intermittently opposed sides 148 of guide rail 84.

Referring to FIG. 4, each slide rail section 143 has an upstream end 150 and an opposed downstream end 152. Thus, each pusher plate 92 will slide from a downstream end 152 of a given slide rail section 143 and onto an upstream end 150 of an adjacent slide rail section 143 downstream thereof. In accordance with the invention, upper surface 144 of each slide rail section 143 along the respective upstream end 150 thereof is beveled or has an upper beveled leading edge 154 which angles downwardly from downstream to upstream. Thus, although upper surfaces 144 of adjacent slide rail sections 143 are to be as close to the same height as one another as possible, should the upper surface 144 of the downstream slide rail section 143 of an adjacent pair of rail sections 143 be raised above the upper surface 144 of the upstream rail section 143, beveled leading edge 154 is configured to compensate for this difference and allow pusher plates 92 to nonetheless slide from one rail section 143 to another without causing a disruption due to pusher plates 92 catching on the upstream end 150 of a rail section 143. Although the angle of the beveled leading edge 154 may vary, FIG. 5 shows leading edge 154 in a relatively exaggerated manner from what is typically involved. Normally, upper surfaces 144 of adjacent slide rail sections 143 are within only a few thousands of an inch difference in height when aligned properly, as discussed further below.

With reference to FIG. 4 and in accordance with the invention, each slide rail section 143 adjacent upstream end 150 is tapered laterally in order to reduce the surface area of upstream end 150. This configuration is also intended to eliminate transition problems when guide plates 92 are sliding from one rail section to another by reducing the leading surface area which would be contacted by a pusher plate 92 if the downstream rail section of a pair of adjacent rail sections 143 were raised sufficiently relative to the upstream rail section to cause pusher plate 92 to engage the leading edge instead of sliding directly onto the respective upper surface 144. The laterally tapered upstream end 150 is thus in contrast with a slide rail which would be squared off as viewed from above. If pusher plate 92 did engage such a squared off leading edge, it would likely cause a serious jam within furnace 10 whereas a tapered or arcuate leading edge would tend to reduce or eliminate the potential for jamming and allow pusher plates 92 to nonetheless move past any increased frictional engagement between pusher plate 92 and the leading edge of a rail section 143. Guide rail 84 also includes sections each having upstream and downstream ends 156 and 158 which are configured in the same manner as those of slide rails 82 and thus include an upper beveled leading edge 160 and are laterally tapered as described with regard to rails 82. Like slide rail sections 143, the guide rail sections are longitudinally spaced from one another when cooler although shown in FIG. 4 as thermally expanded sufficiently to abut one another.

Figure 6:
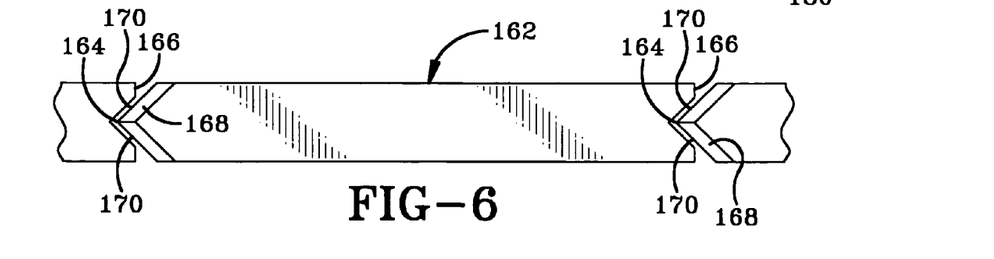
FIG. 6 is a top plan view of a slide rail or guide rail showing a second embodiment thereof.

FIG. 6 shows an alternate embodiment of a slide rail or guide rail section 162 each having upstream and downstream ends 164 and 166 and an upper beveled leading edge 168 which serves the same purposes as that of the embodiment shown in FIG. 4. FIG. 6 differs in that the upstream ends 164 are pointed much in an arrow-like fashion with a pair of straight angled leading sides 170 tapering outwardly and downstream from a tip of intersection of leading edges 170. The downstream ends 152 and 166 of the embodiments shown respectively in FIGS. 4 and 6 define recesses which are of mating configuration respectively with upstream ends 150 and 164.

FIG. 7 illustrates the connection between two adjacent furnace sections 12 and illustrates several aspects of the present invention. FIG. 7 shows the various pieces 124 of felt which are disposed between the respective insulation layers of each of the adjacent furnace sections 12. FIG. 7 also shows that susceptor section 136C of one section 12 is in abutment with susceptor section 136A of the other section 12 in order to form a seal therebetween. As previously noted with reference to FIG. 5, FIG. 7 also shows that upper surfaces 144 of respective slide rail sections 143A and 143C of respective sections 12 are aligned with one another at the same height or very close thereto. Similarly, respective recesses 86A of susceptor sections 136C and 136A of the adjacent sections 12 have respective upper surfaces 172 which are at the same height or very close thereto so that when rail sections 143C and 143A are disposed therein the upper surfaces 144 are aligned as noted above.

In accordance with the invention, the alignment of these various surfaces is made possible by the adjustment assemblies 36A and B which were previously detailed with respect to FIGS. 1 and 2. During assembly of adjacent furnace sections 12, one of furnace sections 12 will be rolled toward another section 12 via wheels 18 on tracks 20. Accurate measurements will be made as to the alignment of the respective susceptors 70 along with the insulation members and rails to insure that the connection between the adjacent furnace sections 12 is properly achieved. More particularly, adjustment assemblies 36 allow either end of the internal structure 66 of a respective section 12 to be adjusted vertically and horizontally to make sure alignment is proper. This prevents damage to the insulation pieces as they are fitted together in an overlapping manner shown in FIG. 7, which is also true of the portions of susceptor 70 disposed in each furnace section 12. Ultimately, adjustment assemblies 36 will be used to very finely adjust the height of upper surfaces 144 of rail sections 143 to ensure a very straight surface on which pusher plates 92 may slide and transition from one rail section to the next.

With reference to FIGS. 5 and 7, another feature of the invention is described. In particular, furnace 10 includes a stop for preventing slide rail sections 143 from sliding in the downstream direction relative to susceptor 70 due to the downstream force which pusher plates 92 transmit to slide rails 82 while sliding downstream thereon. The stops are formed by a stepped configuration in susceptor 70. More particularly, each recess 86A at a downstream end thereof is bounded by a stop ledge 174 which extends upwardly from upper surface 172 of recess 86A. In addition, each slide rail section 143 is formed with a stop ledge 176 which extends downwardly in mating fashion with stop ledge 174 and is disposed in abutment therewith when rail section 143 is disposed within recess 86A. Various other configurations to provide such a stop will be evident to one skilled in the art. It is further noted that the downstream force which pusher plates 92 transmit to slide rails 82 while sliding downstream thereon further is translated to each susceptor section 136 and thus tends to move each susceptor section 136 in the direction indicated at Arrow E in FIG. 5 into a tighter engagement with the adjacent susceptor section 136 downstream thereof. All of susceptor sections 136 are thus pushed against one another toward a susceptor block 180 with a downstream end 178 of susceptor 70 in abutment therewith.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A pusher furnace comprising:
a plurality of furnace sections each including a susceptor;
at least one slide rail extending through the furnace sections and adapted for slidably mounting pusher plates thereon; wherein said pusher plates are distinct from the susceptors and adapted to carry thereon respective loads to be heated within the furnace; and
an alignment assembly for aligning the susceptors with one another.

2. The furnace of claim 1 wherein the alignment assembly includes a vertical adjustment mechanism and a horizontal adjustment mechanism for respectively providing vertical and horizontal adjustment of the susceptors.

3. The furnace of claim 2 wherein each furnace section has first and second opposed ends; wherein one of the first and second ends of at least one furnace section is disposed respectively adjacent the second and first end of an adjacent furnace section; and
further including at least one threaded member disposed adjacent each end of each furnace section so that threadable rotation thereof provides vertical adjustment of the respective end of the furnace section; and at least one threaded member disposed adjacent each end of each furnace section so that threadable rotation thereof provides horizontal adjustment of the respective end of the furnace section.

4. The furnace of claim 1 wherein each furnace section includes an outer vessel; and further including an internal structure disposed within the outer vessel and comprising the respective susceptor, an induction coil, and insulation; wherein the alignment assembly includes four adjustment screws which are mounted on the outer vessel for vertically adjusting the internal structure; and wherein the internal structure is supported by the outer vessel via the four screws.

5. The furnace of claim 1 wherein each furnace section includes a plurality of rollers so that the furnace sections are rollable with respect to one another to facilitate alignment of the susceptors during connection of adjacent furnace sections.

6. The furnace of claim 1 wherein each susceptor is tubular and defines a passage extending there through; and wherein adjacent pairs of the susceptors abut one another with the passages thereof in communication with one another.

7. The furnace of claim 6 wherein each susceptor has first and second opposed ends; and wherein the respective first and second ends of each adjacent pair of the susceptors overlap one another to form a seal there between.

8. The furnace of claim 6 further including an exhaust port which defines an exhaust passage which communicates with the passage of one of the susceptors; wherein the susceptor slidably and sealingly engages the exhaust port whereby the exhaust port is adapted to allow expansion and shrinkage of the susceptor respectively associated with the heating and cooling of the susceptor without damaging the exhaust port.

9. The furnace of claim 1 wherein the at least one slide rail includes a plurality of slide rail sections respectively disposed in the furnace sections and mounted on the respective susceptors thereof; and wherein the alignment assembly serves to align the slide rail sections of adjacent furnace sections with one another.

10. The furnace of claim 1 wherein the at least one slide rail includes a plurality of rail sections having respective upstream and downstream ends; wherein each pair of adjacent rail sections includes an upstream rail section and a downstream rail section; wherein the downstream end of the upstream rail section has an upper surface; and wherein the upstream end of the downstream rail section has an upper surface which is disposed adjacent the downstream end of the upstream rail section and lower than the upper surface thereof whereby the rail sections are adapted to prevent the pusher plates from catching thereon during downstream movement thereof.

11. The furnace of claim 10 wherein the upstream ends of the downstream rail sections are tapered downwardly in an upstream direction.

12. The furnace of claim 10 wherein each upstream end has at least one laterally tapering portion.

13. The furnace of claim 1 wherein the at least one slide rail includes a plurality of rail sections; and wherein a stop is associated with each rail section whereby the stops are adapted to prevent the rail sections from moving downstream in response to sliding of the pusher plates downstream on the slide rails.

14. The furnace of claim 13 wherein the rail sections are seated on the susceptors; and wherein each stop is a ledge which is defined by one of the susceptors and which the rail sections respectively abut.

15. The furnace of claim 1 further including refractory insulation disposed below the susceptors; and a support structure which supports the susceptors so that the susceptors are spaced above the insulation to protect the insulation from degradation from contact with the susceptors.

16. The furnace of claim 15 wherein the support structures include an upper surface on which the susceptors are slidably seated to allow for sliding movement of the susceptors during expansion and shrinkage of the susceptor respectively associated with heating and cooling of the susceptor.

17. The furnace of claim 16 wherein the upper surface is formed of graphoil.

18. The furnace of claim 1 further including a support structure on which the susceptors are slidably mounted to allow for sliding movement of the susceptors during expansion and shrinkage of the susceptor respectively associated with heating and cooling of the susceptor.

19. The furnace of claim 18 wherein the support structure includes a graphoil layer on which the susceptors are slidably mounted to allow for the sliding movement.

20. The furnace of claim 1 further including a plurality of refractory insulation members wherein adjacent insulation members define therebetween a joint gap; further including a piece of compressible refractory felt disposed in each joint gap to allow adjacent insulation members to thermally expand to decrease the size of the joint gap; and wherein each piece of felt substantially fills the respective joint gap during thermal expansion and contraction of the adjacent insulation members defining the joint gap.

21. The furnace of claim 1 wherein the alignment assembly comprises at least one adjustment mechanism on each of the furnace sections for providing respective adjustment of the susceptors relative to one another.

22. The furnace of claim 21 wherein the at least one adjustment mechanism comprises a vertical adjustment mechanism on each of the furnace sections for providing respective vertical adjustment of the susceptors relative to one another.

23. The furnace of claim 22 wherein the at least one adjustment mechanism comprises a horizontal adjustment mechanism on each of the furnace sections for providing respective horizontal adjustment of the susceptors relative to one another.

24. The furnace of claim 21 wherein the at least one adjustment mechanism comprises at least one horizontal adjustment mechanism on each of the furnace sections for providing respective horizontal adjustment of the susceptors relative to one another.

25. The furnace of claim 24 further comprising first and second ends on each furnace section defining therebetween a longitudinal direction; first and second sides on each furnace section defining therebetween an axial direction; a section passage formed in each furnace section extending from its first end to its second end; and an end to end arrangement of the furnace sections whereby the section passages communicate with one another to form a longitudinally elongated furnace passage in which the at least one slide rail is disposed; and wherein the at least one horizontal adjustment mechanism provides respective horizontal adjustment of the susceptors in the axial direction.

26. The furnace of claim 25 wherein the at least one horizontal adjustment mechanism comprises first and second horizontal adjustment mechanisms respectively adjacent the first and second ends of each furnace section for providing respective horizontal adjustment of the susceptors in the axial direction adjacent the respective first and second ends of the furnace sections.

27. The furnace of claim 26 wherein the alignment assembly comprises first and second vertical adjustment mechanisms respectively adjacent the first and second ends of each furnace section for providing respective vertical adjustment of the susceptors adjacent the respective first and second ends of the furnace sections.

28. The furnace of claim 21 further comprising an outer vessel on each furnace section in which the at least one slide rail and the respective susceptor is disposed; and wherein the at least one adjustment mechanism is mounted on each outer vessel for adjusting the position of the respective susceptor relative to the outer vessel.

29. The furnace of claim 28 further comprising a plurality of rollers mounted externally on each outer vessel so that the furnace sections are rollable with respect to one another to facilitate alignment of the susceptors during connection of adjacent furnace sections.

30. The furnace of claim 28 wherein each susceptor is part of an internal structure disposed within the respective outer vessel; and the at least one adjustment mechanism comprises a vertical adjustment mechanism which is mounted on the respective outer vessel, supports the internal structure within the vessel and provides vertical adjustment of the internal structure relative to the outer vessel.

31. The furnace of claim 30 wherein the internal structure comprises the at least one slide rail.

32. The furnace of claim 31 wherein the at least one slide rail comprises a pair of laterally spaced substantially parallel slide rails; and the internal structure comprises a guide rail disposed between the pair of slide rails and adapted to be received within respective slots of the pusher plates for guiding their movement through the furnace.

33. The furnace of claim 30 wherein the internal structure comprises refractory insulation and an induction coil for inductively heating at least one of the susceptors.

34. The furnace of claim 33 wherein the internal structure comprises a faraday ring.

35. The furnace of claim 1 further comprising at least one induction coil for inductively heating at least one of the susceptors.

36. The furnace of claim 35 wherein the at least one induction coil circumscribes the at least one susceptor and the at least one slide rail.

37. The furnace of claim 36 wherein the at least one slide rail comprises a pair of spaced substantially parallel slide rails; and further comprising a guide rail disposed between the slide rails adapted to be received within respective slots of the pusher plates for guiding their movement through the furnace; and wherein the induction coil circumscribes the guide rail.

38. The furnace of claim 36 further comprising an outer vessel in which the induction coil is disposed.

39. The furnace of claim 36 further comprising refractory insulation which circumscribes the at least one susceptor; and wherein the induction coil circumscribes the insulation.

40. The furnace of claim 39 wherein the insulation comprises a lower section of insulation which is below the at least one susceptor and has an upper surface; and further comprising a support structure which supports the susceptors so that the susceptors are spaced above the upper surface of the lower section of insulation to protect the insulation from degradation from contact with the susceptors; and wherein the induction coil circumscribes the support structure.

41. The furnace of claim 35 wherein the at least one induction coil comprises first and second induction coils; and further comprising a faraday ring disposed between the first and second induction coils.

42. The furnace of claim 1 wherein the at least one slide rail is seated on the susceptors.

43. The furnace of claim 1 wherein the susceptors during operation of the furnace are substantially stationary other than movement associated with thermal expansion and shrinkage of the susceptors.

44. The furnace of claim 1 further comprising the pusher plates; and wherein the pusher plates slidably engage the at least one slide rail and move relative to the susceptors during movement of the pusher plates through the furnace.

45. The furnace of claim 44 wherein the susceptors each have upstream and downstream ends and abut one another in end to end fashion; the susceptors comprise a first susceptor and a second susceptor downstream of the first susceptor; and the pusher plates slidably engage the at least one slide rail to slide downstream thereon through the furnace from adjacent the upstream end of the first susceptor to adjacent the downstream end of the second susceptor.

46. The furnace of claim 44 wherein the pusher plates slidably engage the at least one slide rail with adjacent pusher plates in abutment with one another.

47. The furnace of claim 1 further comprising first and second threaded members of the alignment assembly; a first threaded engagement between the first and second threaded members; and wherein rotation of the first threaded member relative to the second threaded member provides one of vertical and horizontal adjustment of a first one of the susceptors relative to a second one of the susceptors via the first threaded engagement.

48. The furnace of claim 47 further comprising third and fourth threaded members of the alignment assembly; a second threaded engagement between the third and fourth threaded members; and wherein rotation of the third threaded member relative to the fourth threaded member provides the other of vertical and horizontal adjustment of the first one of the susceptors relative to the second one of the susceptors via the second threaded engagement.

49. The furnace of claim 1 wherein the at least one slide rail abuts the susceptors.

50. The furnace of claim 1 wherein each susceptor has a top wall and a bottom wall therebelow; and the at least one slide rail extends below the respective top walls and above the respective bottom walls.

* * * * *